UNITED STATES PATENT OFFICE.

CHARLES CARROLL GILMAN, OF ELDORA, IOWA, ASSIGNOR, BY MESNE ASSIGNMENTS, TO GILMAN POROUS TERRA COTTA COMPANY, OF NEW YORK, N. Y.

FIRE-PROOF COMPOSITION.

SPECIFICATION forming part of Reissued Letters Patent No. 10,420, dated December 11, 1883.

Original No. 248,094, dated October 11, 1881. Application for reissue filed October 16, 1883.

DIVISION 2.

*To all whom it may concern:*

Be it known that I, CHARLES CARROLL GILMAN, of Eldora, in the county of Hardin and State of Iowa, a citizen of the United States of America, have invented a new and useful composition of matter to be used in carpentry, fireproofing, and all other purposes where a porous material indestructible by fire, acids, and gases, a poor conductor of heat, sound, and electricity, possessing molecular and capillary attraction, and workable with edged tools, may be used to advantage, of which the following is a specification.

My composition consists of the following ingredients, combined in the proportions stated: kaolin-clay, free from grit, one part; resinous sawdust, from one to three parts, as porosity may be required; water sufficient to thoroughly incorporate the above, by the aid of machinery, into a plastic mass.

Removed from the grinding-tubs where it has been ground, the spongy product is forced by plungers driven by steam through iron or steel cylinders to express the superincumbent moisture therefrom, and issues forth in the shape of long blocks or logs, of length, form, and size best fitted for handling, usually eight to twelve inches in thickness and from four to six feet in length. When sufficiently dry to render handling safe, these logs are moved into kilns or clamps calculated for the purpose by the aid of small derricks or otherwise. After the steam and vapors are driven out by a slow steadily-increasing fire, the temperature is rapidly raised to nearly a white heat, which not only consumes the sawdust, but brings the clay itself into the first stages of vitrifaction. On cooling, the logs may be removed to the mill, and are adapted to be sawed into planks, boards, and dimension-stuff, as lumber from wood is manufactured, and subsequently fashioned in the workshop into such forms and articles as are demanded by purchasers. This material, being free from grit and tough in texture, can be cut, sawed, bored, grooved, planed, and carved with edged tools, and before or after such treatment can, after slipping and glazing, be submitted to a second firing, with fine results in ornamentation obtained.

I am aware that like compositions have been made from a very early date, and that English and American patents have been granted therefor—English Patent No. 12,619, issued to Goodfellow in 1849, and American Patent No. 216,196, issued to Lilly in 1879; but I claim that no composition of this character, so far as I can learn, has been made of the same material, with the same proportions, and in the same manner, and without these materials, proportions, and treatment, as described, the full results which I assert cannot be reached.

What I claim, therefore, and desire to secure by Letters Patent of the United States, is—

A composition of matter to be used for fireproofing and other purposes, consisting of kaolin-clay, free from sand or sandy clay, and resinous sawdust, in the proportions specified, prepared with water, machine-pressed, dried, burned, and adapted, when burned, to be sawed or wrought with edged tools, in a manner described in the foregoing specification.

CHARLES CARROLL GILMAN.

Witnesses:

A. G. N. VERMILYE,

A. S. FITCH.